United States Patent [19]

Saito et al.

[11] 4,314,828
[45] Feb. 9, 1982

[54] METHOD AND SYSTEM FOR REGENERATING DEHUMIDIFIER FOR USE IN CHARCOAL ADSORBER

[75] Inventors: Toru Saito; Masaki Takeshima, both of Hitachi, Japan

[73] Assignee: Hitachi, Ltd., Tokyo, Japan

[21] Appl. No.: 121,460

[22] Filed: Feb. 14, 1980

[30] Foreign Application Priority Data

Feb. 14, 1979 [JP] Japan .................. 54-15907

[51] Int. Cl.³ .............. B01D 53/04; B01D 59/26
[52] U.S. Cl. .............................. 55/26; 55/31; 55/33; 55/62; 55/66; 55/74; 55/179; 55/208; 55/387
[58] Field of Search .............. 55/25, 26, 31, 33, 62, 55/66, 179, 208, 387, 389, 74, 75, 180

[56] References Cited

U.S. PATENT DOCUMENTS

| | | | |
|---|---|---|---|
| 2,699,837 | 1/1955 | Van Note | 55/33 X |
| 2,793,507 | 5/1957 | Hnilicka | 55/66 X |
| 3,080,307 | 3/1963 | Rinald | 55/179 X |
| 3,116,987 | 1/1964 | Honerkamp et al. | 55/31 |
| 3,140,931 | 7/1964 | McRobbie | 55/31 X |
| 3,922,150 | 11/1975 | Yusa et al. | 55/66 X |
| 3,963,460 | 6/1976 | Stumpf et al. | 55/66 |

FOREIGN PATENT DOCUMENTS 2343313 3/1975 Fed. Rep. of Germany .......... 55/66
48-30120 9/1973 Japan ...................... 55/33

Primary Examiner—Robert H. Spitzer
Attorney, Agent, or Firm—Craig and Antonelli

[57] ABSTRACT

A method and system for continuously regenerating dehumidifiers of a charcoal adsorber system are provided. Off-gas, including radioactive noble gases, such as xenon and krypton, is physically adsorbed in charcoal adsorbers and discharged to the atmosphere after its radioactivity has decayed. Before passing to the charcoal adsorbers, the off-gas is subjected to dehumidifiers consisting of a molecular sieve or some other desiccant. A couple of dehumidifiers is alternately used because periodic regeneration for the dehumidifier is necessary to recover moisture adsorption ability of the desiccant. The regeneration for the dehumidifier is completed by the steps of purging the dehumidifier with fresh air, and thereafter circulating the fresh air within a closed loop including a heater, dehumidifier, cooler condenser, and blower. Moisture absorbed in the dehumidifier is carried away by circulating heated fresh air and separated from the fresh air by cooling condensers. After completion of the regeneration, the fresh air is returned to the charcoal adsorber system for further treatment. By employing fresh air as regeneration gas, the regeneration for dehumidifiers can be completed faster and with less contamination as compared with a conventional method of employing off-gas for regeneration.

15 Claims, 3 Drawing Figures

METHOD AND SYSTEM FOR REGENERATING DEHUMIDIFIER FOR USE IN CHARCOAL ADSORBER

BACKGROUND AND SUMMARY OF THE INVENTION

This invention relates to a charcoal adsorber system for selectively holding up such fission gases as xenon and krypton included in off-gas discharged from a nuclear reactor plant. The present invention especially relates to a method and system for regenerating dehumidifiers, which dehumidifiers are provided in the charcoal adsorber system in order to dehumidify the off-gas to be treated.

During operation of a nuclear reactor plant, many kinds of materials are formed through nuclear fission processes. Among those materials are xenon and krypton, which are non-condensable radioactive noble gases, so that before discharging the off-gas to the atmosphere, it is necessary to recover and store the off-gas, such as in a charcoal adsorber system, until the radioactivity of the off-gas decreases to a certain degree so that it will not cause impermissible air contamination. By the charcoal adsorber system, radioactive noble gases are selectively kept for a certain period of time in a charcoal bed until radioactivity is effectively decayed. Meanwhile, between the relative humidity of the off-gas to be treated and the moisture content of the charcoal, there exists a certain relationship and to attain a higher adsorption efficiency of the charcoal, it is required to maintain the off-gas to be passed through the charcoal in a dry state. Usually, moisture in the off-gas to be treated is removed beforehand by passing the off-gas through a dehumidifier which includes a molecular sieve or some other desiccant. However, because of the fact that the dehumidifying ability of the dehumidifier also decreases along with the amount of moisture absorbed in the desiccant, periodic regeneration of the dehumidifier is important. In order to accomplish the regeneration of the dehumidifier, it is known to use a part of the off-gas, which yet includes radioactive noble gases, as regeneration gas. That is, according to the examined Japanese patent application, Publication No. 48-30120, published Sept. 17, 1973, a part of the off-gas which is untreated and includes radioactive noble gas, is introduced to a dehumidifier in a heated state. The heated off-gas removes moisture from the desiccant, which moisture is then separated from this off-gas by some cooling method. The off-gas employed for regeneration is recovered and returned to the charcoal adsorber system for further treatment. Normally, several hundred $Nm^3$/hour (normal cubic meters/hour) of regeneration gas is required to complete the regeneration within a desired period of time. However, when the amount of off-gas, which is usually small (about 1 to 10 $Nm^3$/h) and variable because the amount is determined by the amount of air captured by leakage in a main condenser of the nuclear plant, becomes smaller than usual, the amount of off-gas for the regeneration becomes insufficient to complete the regeneration of the dehumidifier within a desired period of time. Also, there is another drawback in the above-described regeneration system in that further contamination in the regeneration system can be expected because the radioactive off-gas is employed for the regeneration.

An object of the invention is to provide a method and system for regenerating a dehumidifier for use in a charcoal adsorber system in which the regeneration can be performed in a shorter period of time and independently of the amount of off-gas produced.

Another object of the invention is to provide a method and system for regenerating a dehumidifier for use in a charcoal adsorber system in which the regeneration can be performed without causing any radioactive contamination in the regenerating system.

According to preferred embodiments of the present invention, a method and system for regenerating a dehumidifier for use in a charcoal adsorber system is provided in which the dehumidifier which absorbs moisture from off-gas to be treated in a charcoal adsorber is purged of radioactive materials by fresh purge air and thereafter regenerated by fresh regeneration air. The fresh purge air which may be contaminated by radioactive materials within the dehumidifier is treated in the charcoal adsorber so that contamination of the dehumidifier by radioactive material during regeneration is advantageously prevented. Further, regeneration by fresh regeneration air advantageously reduces the time required for the regeneration as compared with regeneration performed by off-gas. The regeneration of the dehumidifier by fresh regeneration air is preferably performed by circulating the fresh regeneration air within the dehumidifier while heating the fresh regeneration air and separating moisture from the fresh regeneration air. The circulation of the fresh regeneration air advantageously eliminates the unnecessary increase of the amount of off-gas which should be treated in the charcoal adsorber system.

According to other preferred embodiments of the present invention, the pressure of the fresh regeneration air is controlled to be a desirable amount so that pressure changes will not cause leakage of the removed water or the fresh regeneration air during the regeneration process.

These and further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
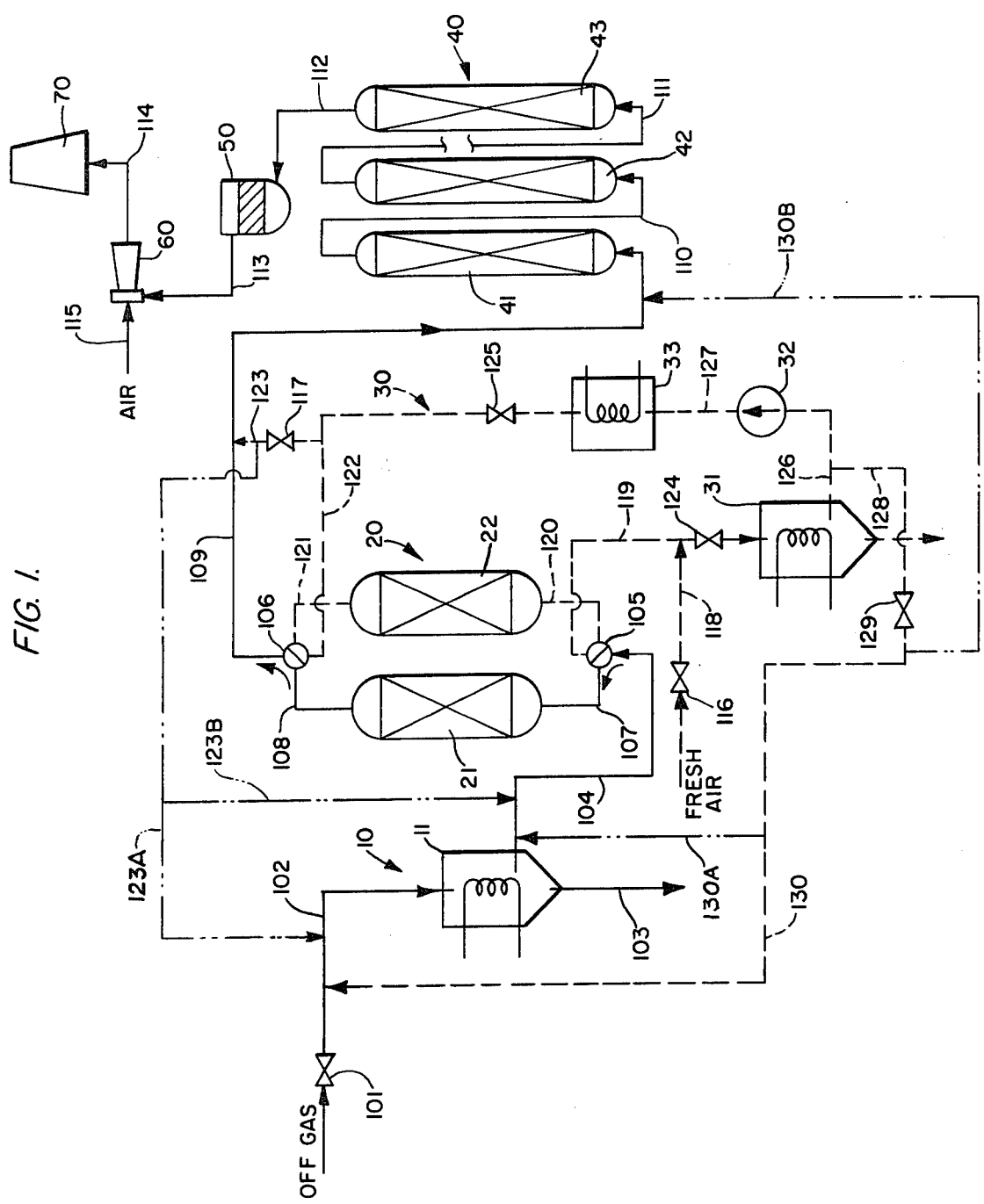
FIG. 1 is a schematic flow diagram showing a charcoal adsorber system according to a first preferred embodiment of the present invention.

Hereafter, a charcoal adsorber system will be described with reference to FIG. 1, in which main components of the system are a dehumidifier 20, a regeneration system 30 of the dehumidifier 20, and a charcoal adsorber 40.

Off-gas produced as exhaust gas from a nuclear reactor (not shown) is introduced into a cooler condenser 11 through a valve 101 and line 102. Cooling medium is circulated in the cooler condenser 11 and the off-gas introduced into the cooler condenser 11 is cooled down by the cooler condenser 11 to about 6° C. and air dried prior to its passage to the following dehumidifier 20. The temperature in the cooler condenser 11 is maintained higher than 0° C. so that moisture in the off-gas will not freeze in the condenser. Moisture removed partly in the cooler condenser 11 is exhausted as waste water through line 103 for further anti-pollution treatment. The air-dried off-gas is introduced into a dehumidifying stage 20 through a line 104. As explained above, periodic regeneration of the dehumidifier is necessary to obtain effective dehumidifying ability. In this embodiment, a pair of dehumidifiers 21 and 22 are employed to enhance effective use of the dehumidifiers while under regeneration for one of the dehumidifiers. As apparent from the drawing, each of the dehumidifiers is so arranged with switch valves 105 and 106 that they may be used alternatively as one actively dehumidifying and another regenerating for the next use. In this FIG. 1 illustration, the switch valves 105 and 106 are so arranged that the off-gas from the cooler condenser 11 is supplied only to the dehumidifier 21 through the line 107 and exhausted to the next step of the charcoal adsorber 40 through lines 108 and 109. In the dehumidifier 21 (and 22 when in a dehumidifying phase), the air-dried off-gas from the cooler condenser 11 is further dehumidified to a dew point of −30° C. The dehumidifiers 21 and 22 are packed with solid moisture adsorber such as molecular sieve, active alumina or some other desiccant, which is adopted as a means of removing humidity, with a view to enhancing the hold up performance of the following charcoal adsorbing stage. The dehumidifier 22 is shown in FIG. 1 as connected to the regenerating system 30, later explained.

After being dehumidified, the off-gas is introduced into the charcoal absorbers 40, which includes a plurality of charcoal beds, such as beds 41, 42, and 43 connected in series by lines 110 and 111. Adsorption of specific gases by charcoal beds is a physical adsorption phenomenon dependent on their boiling points. The higher the boiling point, the more readily the gas is adsorbed. When the off-gas is passed through a charcoal bed, low-boiling air components such as nitrogen (boiling point −195.8° C.) and oxygen (−182.9° C.), do not undergo adsorption, but high-boiling xenon (−108.1° C.) and krypton (−153.2° C.) are adsorbed reversely on the surface of charcoal, moving slowly along the off-gas stream while repeating adsorption and desorption in the charcoal beds. By holding up or storing radioactive rare gases in the charcoal beds, their radioactivity is effectively decayed until they are discharged to the atmosphere. Before the off-gas is discharged, in order to remove the radioactive aerosol which has passed through the charcoal adsorber 40, the off-gas exhausted through line 112 is passed through a filter 50 further to reduce the radioactivity of the off-gas to a safety degree.

To avoid the outleakage of radioactive off-gas from the charcoal system, a negative pressure is maintained throughout the system. Therefore, the off-gas completing the treatment is discharged out to the atmosphere by the ejector 60. The ejector 60 is provided between lines 113 and 114. Compressed air is introduced through a line 115 to the ejector 60 and the off-gas is discharged through the line 114 and a stack 70 to the atmosphere with a stream of the compressed air without causing any positive pressure in the entire system.

Referring now to the regeneration system 30 for the dehumidifier 22 (or 21), the system is schematically depicted by dotted lines in FIG. 1 and includes a cooler condenser 31, a blower 32 and a heater 33. Before starting operation of the regeneration system, the dehumidifier 22 to be regenerated is purged by employing fresh air to blow away radioactive gases and particles which may cause contamination in the regeneration system during the regeneration process. The purge air is introduced by opening valves 116 and 117 through lines 118, 119, and 120, because the pressure in the dehumidifier 22 is kept negative pressure. The purge air blows away radioactive material in the dehumidifier 22 and then is discharged into the charcoal adsorber 40 through the lines 121, 122, 123 and 109. In this instance, valves 124 and 125 are closed. The air purge is effective to reduce the possibility of contamination in the regeneration system by radioactive materials. Without such air purge, radioactive materials would be spread over the regeneration system and the possibility of same leaking out to the atmosphere during the regeneration process, hereafter disclosed in detail, would increase.

In alternative preferred embodiments, the purge air which has been blown through the dehumidifier 22 is sent to either the cooler condenser 10 (depicted by dash-dot line 123A in FIG. 1) or the dehumidifier 21 (depicted by dash-dot line 123B in FIG. 1) in order to desiccate the purge air before it is treated in the charcoal adsorber 40.

Although the amount of the fresh purge air spent for the air purge, which is about 10 Nm$^3$/hour (normal cubic meters/hour)×3 hours, may cause a temporary increase in the amount of off-gas to be treated in the charcoal adsorber, it is negligible as compared with the capacity of the charcoal adsorber (capacity of practical embodiment of the charcoal adsorber is 1 to 10 Nm$^3$/hour×30 days). After finishing the air purge, the valve positions are reversed, with valves 116 and 117 being closed and valves 124 and 125 being opened, so that fresh air may be maintained in a closed loop comprising the dehumidifier 22, lines 120, 119, cooler condenser 31, line 126, blower 32, line 127, heater 33, lines 122 and 121. The fresh air in the closed loop is then circulated within the closed loop as fresh regeneration air by means of the blower 32. The regeneration air supplied to the dehumidifier 22 is heated by the heater 33, for example, to about 320° C., so that the temperature at the entrance of the dehumidifier 22 will be about 250° C. in view of heat loss in the conduit lines 122 and 121. Circulation of the regeneration air is continued until the temperature at the exit of the dehumidifier becomes, for example, 200° C. Water absorbed in the desiccant of the dehumidifier is carried away by the heated regeneration air and condensed at the cooler condenser 31, where the regeneration air is cooled about 40° C. The water separated by the cooler condenser 31 is then recovered through a line 128 for further anti-pollution treatment. By continuing the above-described heating-regeneration process, the regeneration is completed in about eight hours in a practical embodiment where the capacity of the dehumidifier is 30 Nm$^3$/hour, which is short enough as compared with five days or more, which is a normal design time between successive regenerations of the dehumidifiers.

After finishing the regeneration, the regeneration air is cooled while circulating within the closed loop in certain preferred embodiments. In this case, it is desirable to cool the dehumidifier simply by ceasing the heating in the heater 33 and circulating the regeneration gas through the loop including the cooler 31. Also, it is desirable to reverse the circulating direction of the regeneration air in case of cooling. That is, regeneration air flows from the bottom to the top of the dehumidifier. If there is sufficient time, spontaneous cooling of the dehumidifier may be taken advantage of without circulating the regeneration air within the closed loop. After cooling, the regeneration air is then discharged by opening a valve 129 through a line 128 for further charcoal adsorption treatment. Because the regeneration air discharged from the line 128 normally includes moisture even if it is dehumidified in the cooler condenser 31, it is desirable to return the regeneration air to the cooler condenser 11 for further dehumidifying. In this embodiment, the regeneration air is returned to the inlet line 102 to the cooler condenser 11 through lines 128 and 130.

By the above-described procedures, the regeneration for the dehumidifier 22 is completed well before the time that the dehumidifier 21 requires regeneration. When the dehumidifier 21 absorbs moisture and regeneration is required, exchange of dehumidifiers 21 and 22 is simply made by turning switch valves 105 and 106 from the illustrated position in FIG. 1.

In other preferred embodiments, arrangements are similar to the FIG. 1 construction with the cooler condenser 31 within the closed loop replaced by some other moisture separating apparatus.

Also, in the above-described embodiment of FIG. 1, regeneration air used for the regeneration is returned to the cooler condenser 10 to accommodate use of a cooler condenser 31 having insufficient cooling capacity to remove the moisture from the regeneration air. However, other embodiments are contemplated wherein the cooler condenser 31 has sufficient cooling capacity to remove the moisture; in this case, the regeneration air used for the regeneration is directly sent to the dehumidifier 21 or the charcoal adsorber 40 through lines 130A or 130B for further treatment (lines 130A and 130B being shown as dot-dash lines to depict alternate embodiments).

Figure 2:
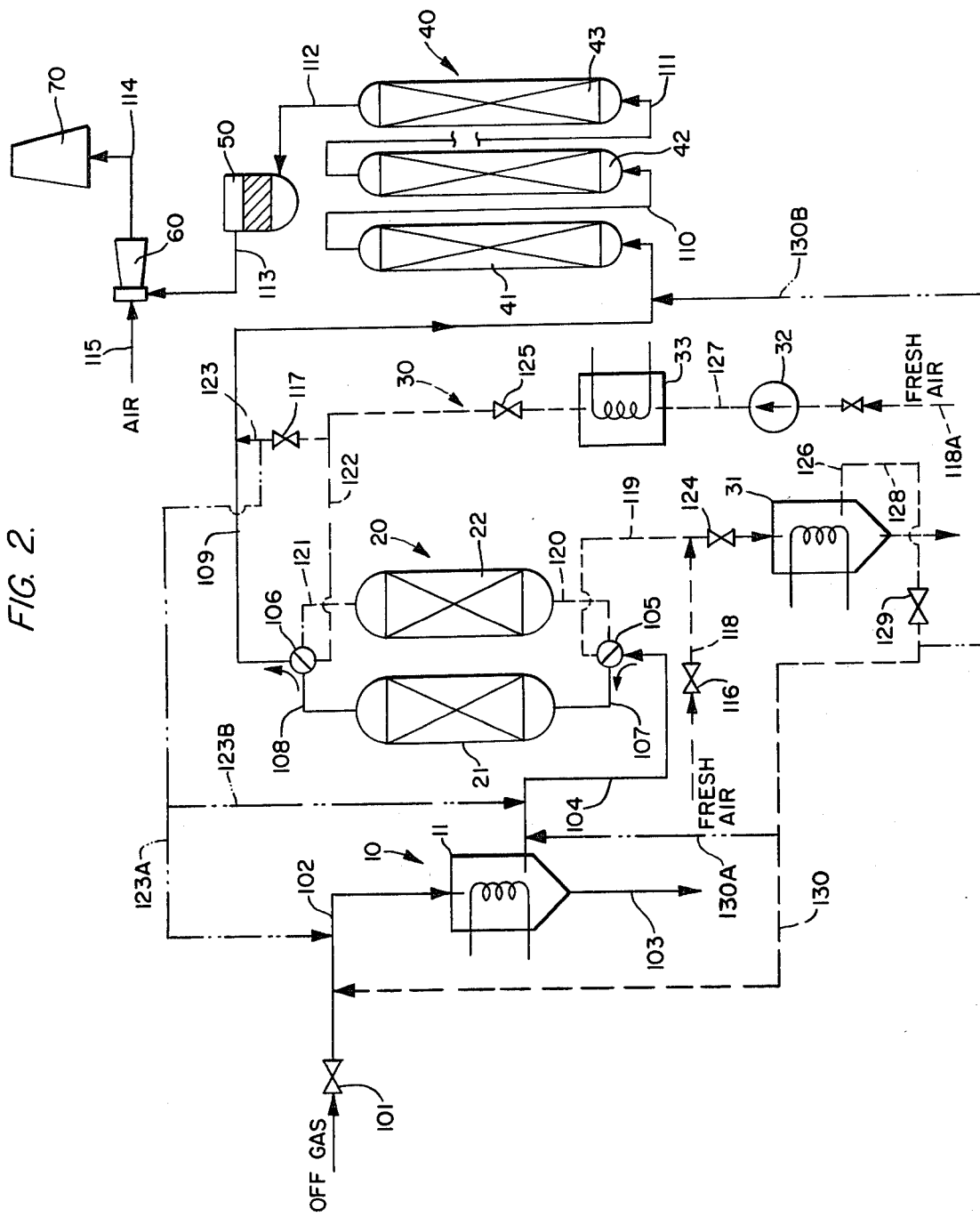
FIG. 2 is a schematic flow diagram showing a charcoal adsorber system according to a second preferred embodiment of the present invention.

In the above-described embodiments of FIG. 1, the regeneration air is circulated within the closed loop to maximize the efficiency of regeneration. This is also because the circulation of the regeneration air is effective to eliminate the increase of off-gas which should be treated in the charcoal adsorber system. However, if the capacity of the charcoal adsorber allows, the regeneration air may go through the dehumidifier 21 instead of circulating in the closed loop. Referring to FIG. 2, after completing an air purge by fresh air, fresh air from 118A is continuously supplied while heating by the heater 33 into the dehumidifier 22. The fresh air which passed through the dehumidifier 22 and the cooler condenser 31 can be directly exhausted to the charcoal adsorber system through the lines 130, 130A, or 130B, without circulating in the closed loop.

In these FIG. 2 embodiments, the amount of off-gas to be treated in the charcoal beds 40 increases as compared with the embodiment shown in FIG. 1, so that it is preferable to increase the capacity of the charcoal beds 40.

Figure 3:
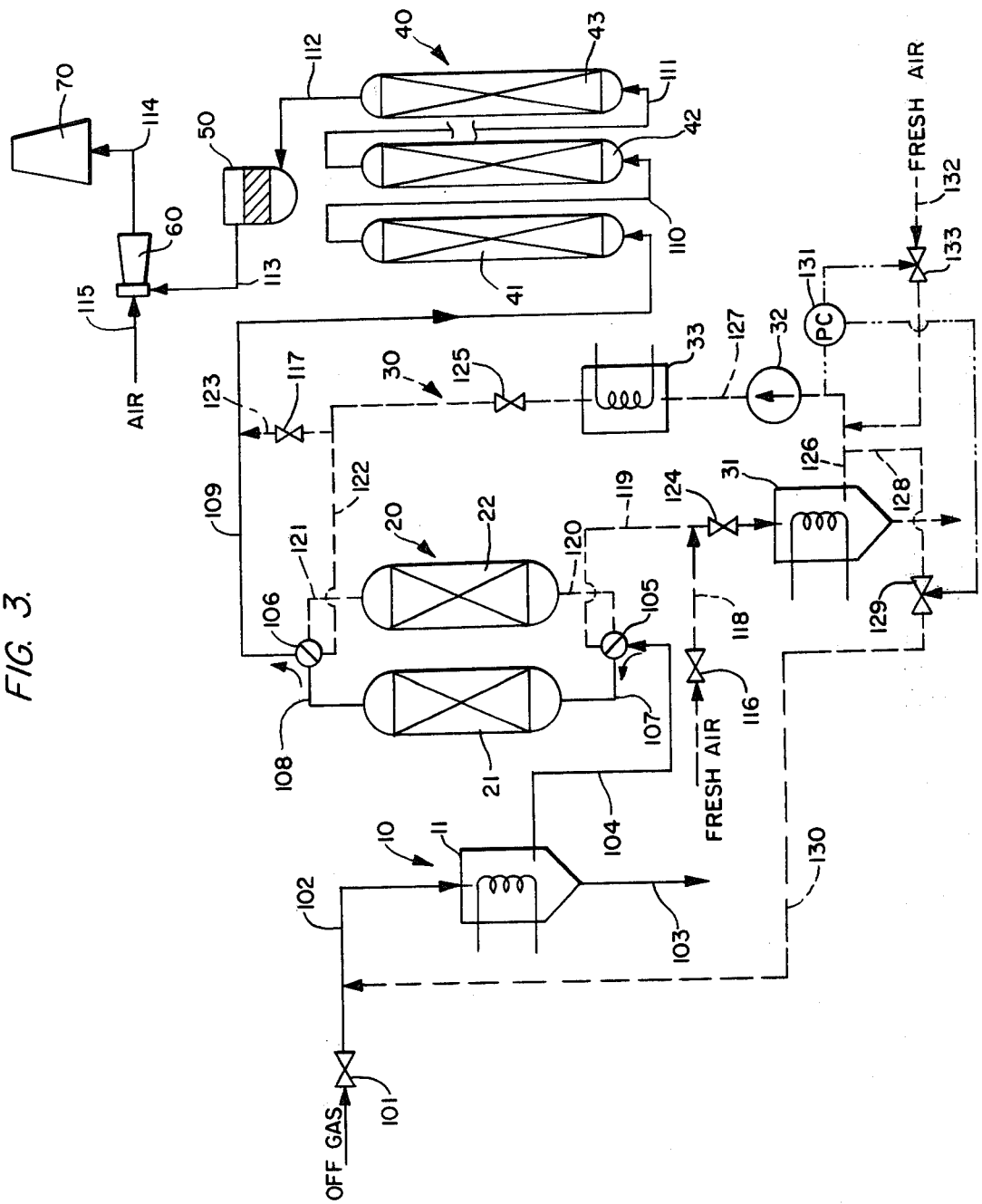
FIG. 3 is a schematic flow diagram showing a charcoal adsorber system according to another preferred embodiment of the present invention.

During the regeneration procedures, using preferred embodiments of the present invention, the pressure in the closed loop may vary substantially due to temperature variation resulting from heating and cooling of the regeneration air. For example, such temperature may vary from room temperature to 350° C. It is desirable to keep the pressure of the regeneration air at a desirable value from the viewpoint of leakage of removed water or regeneration air. In the embodiment shown in FIG. 3, pressure control means are additionally provided to the above-described regeneration system shown in FIG. 1. The pressure in the closed loop is detected by the pressure controller 131. When the pressure in the closed loop increases due to thermal expansion of the regeneration air, signals are generated by the pressure controller 131 which in turn control the valve 129 such that part of the regeneration gas is exhausted outside of the closed loop through the line 130 to maintain the pressure in the closed loop at a desirable value. Also, when the pressure in the closed loop decreases due to thermal contraction of the regeneration air, signals are generated by the controller 131, which in turn control a valve 133 so that fresh air may be supplied through a line 132 into the closed loop.

While we have shown and described several embodiments in accordance with the present invention, it is understood that the same is not limited thereto, but is susceptible of numerous changes and modifications as known to those skilled in the art, and we therefore do not wish to be limited to the details shown and described herein, but intend to cover all such modifications as are encompassed by the scope of the appended claims.

What is claimed is:

1. A method of regenerating a dehumidifier, of the type which absorbs moisture from an off-gas including radioactive noble gas such as xenon and krypton to remove moisture therefrom, after said dehumidifier has been used to remove moisture from said off-gas, said method comprising:
   purging the dehumidifier by passing a first supply of purging gas therethrough to blow away radioactive materials retained in the dehumidifier after use of the dehumidifier to remove moisture from said off-gas, said first supply of purging gas being separate from the off-gas and being substantially free of radioactive components prior to passing through said dehumidifier,
   regenerating the dehumidifier by passing a second supply of gas in a heated state to remove moisture absorbed in the dehumidifier, said second supply of gas being separate from the off-gas and being substantially free of radioactive components prior to passing through said dehumidifier and constituting a regenerating gas for the dehumidifier, and
   subjecting the first and second gas supplies, after passage through said dehumidifier, to further treatment in a charcoal adsorber system so that regeneration of the dehumidifier can be completed without leaving any substantial amount of radioactive materials in the dehumidifier.

2. A method according to claim 1, wherein the first and second gas supplies comprise air, further including a step of circulating the second gas supply through the dehumidifier in a heated state while separating moisture from the second gas supply, which moisture is removed from the dehumidifier.

3. A method according to claim 2, wherein said moisture separating step includes cooling the second gas supply and condensing the moisture.

4. A method according to claim 3, wherein the pressure of the second gas supply circulating through the dehumidifier is maintained at a predetermined desirable pressure.

5. A method according to claim 2, wherein the pressure of the second gas supply circulating through the dehumidifier is kept at a predetermined desirable pressure.

6. A method according to claim 2 or 3, further comprising a step of cooling the dehumidifier after completing said regeneration step by circulating the second gas supply through the dehumidifier without heating the same.

7. A method according to claim 6, wherein, in said step of cooling, the second gas supply is circulated through said dehumidifier in a flow direction opposite to the flow direction during the step of regenerating the dehumidifier.

8. A method according to claim 2 or 3, further comprising a step of cooling the dehumidifier after completing said regenerating step by leaving the dehumidifier without regeneration gas flow therethrough until the temperature goes down spontaneously.

9. A method according to claim 1, wherein the second gas supply is circulated through the dehumidifier in a heated state while separating moisture from the second gas supply and wherein the pressure of the second gas supply circulating through the dehumidifier is kept at a predetermined desirable pressure.

10. A system for regenerating a dehumidifier, for use in a charcoal adsorber system wherein radioactive noble gases are adsorbed from off-gases, comprising:

dehumidifiers, which include desiccant and through which off-gas including radioactive noble gases such as xenon or krypton is dehumidified, charcoal adsorbing means, where dehumidified off-gas is introduced and radioactive materials are adsorbed until radioactivity of the off-gas is decayed, first supply means for supplying a first gas through said dehumidifier for purging radioactive materials retained in the dehumidifier after passage of off-gas therethrough, said first gas being separate from the off-gas and being substantially free of radioactive contaminants, and means for passing said first gas from said first supply means through the dehumidifier, regenerating means for regenerating said dehumidifier, said regenerating means including a second supply means for supplying a second gas through the dehumidifier and means for passing the second gas from said second supply means in a heated state through said dehumidifier so that the moisture retained in said dehumidifier after passage of the off-gas therethrough is removed with the heated second gas, said second gas being separate from the off-gas and being substantially free of radioactive components, and means for introducing the first gas to said charcoal adsorbing means after the first gas has been used to purge said dehumidifier, and means for introducing the second gas to said charcoal adsorbing means after the second gas has been used to regenerate said dehumidifier.

11. A system according to claim 10, wherein said first and second supply means comprise means for supplying air, and wherein said regenerating means includes circulating means for circulating the second gas through said dehumidifier via a closed loop comprising said dehumidifier, heating means, blower means, and moisture separating means, whereby the moisture retained in said dehumidifier is removed and separated from the second gas.

12. A system according to claim 11, wherein said moisture separating means comprises cooling type condensing means.

13. A system according to claim 12, further including means for controlling the pressure of the second gas supply while circulating in said closed loop at a predetermined desirable pressure.

14. A system according to claim 10 or 11, wherein said dehumidifiers comprise a pair of dehumidifiers, each of which is alternately connected to said first and second supply means for the purpose of regeneration of the respective dehumidifier so connected.

15. A system according to claim 14, further including a means for introducing the second gas into the other of said pair of dehumidifiers after said second gas has been used for regeneration for one of said pair of dehumidifiers and prior to said second gas being passed to said charcoal adsorbing means.

* * * * *